Patented Mar. 5, 1946

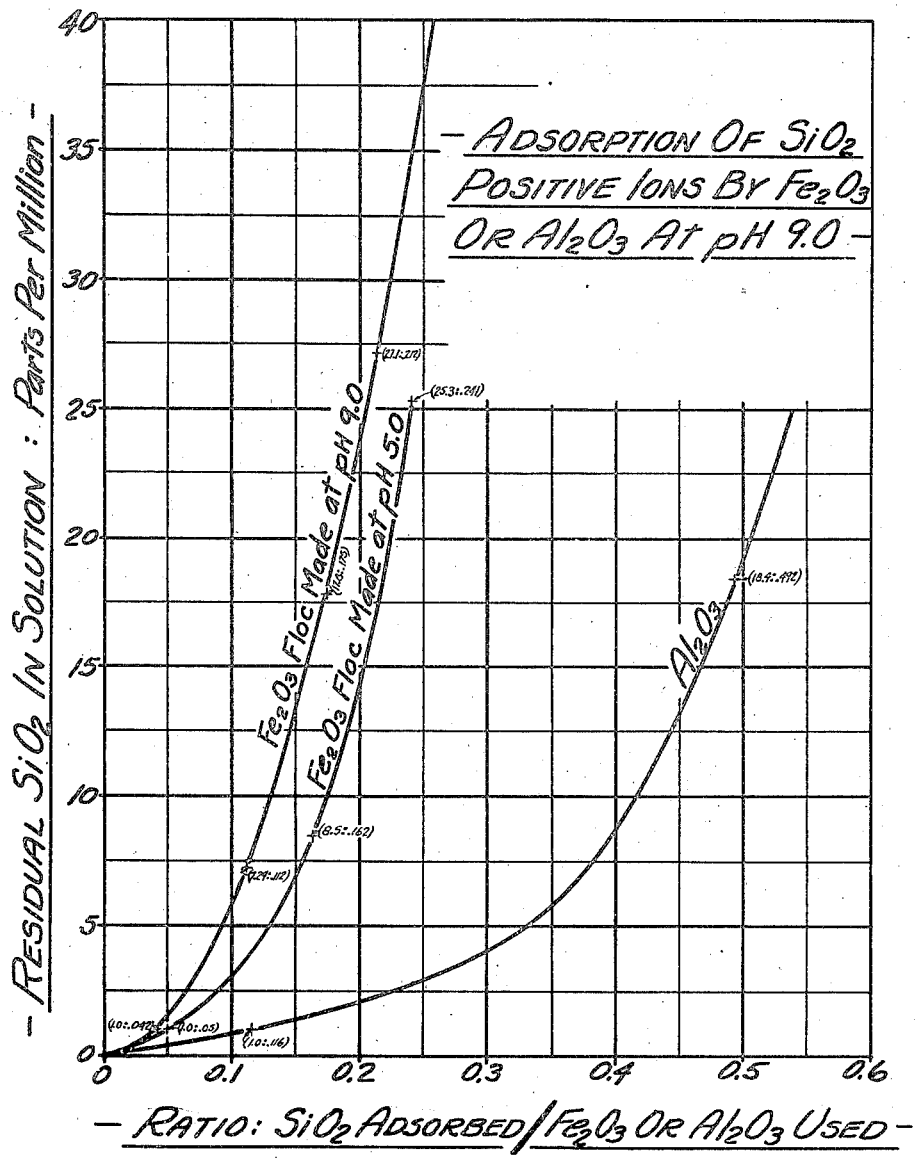

2,396,220

UNITED STATES PATENT OFFICE 2,396,220

TREATMENT OF WATER TO REMOVE SILICA

William S. Wilson, Brookline, and Howard Noyes Dole, Haverhill, Mass., assignors to Monsanto Chemical Company, St. Louis, Mo., a corporation of Delaware Original application July 10, 1939, Serial No. 283,588. Divided and this application April 2, 1943, Serial No. 481,532

20 Claims. (Cl. 210—23)

This invention relates to the purification of water and particularly to the removal, to whatever extent is required, of dissolved silica therefrom.

Natural waters invariably contain silica in dissolved form. In the past, the presence of moderate amounts of silica has been unobjectionable; however, with the introduction of various modern industrial processes and equipment, as for example, the high-pressure steam boilers, the removal of silica has become a vital necessity since it tends to form a scale, especially if the water also contains calcium or aluminum, which scale is hard, dense and resists heat transfer to such an extent as to impair the usefulness and safety of the heat transfer surfaces.

It has been shown heretofore by others that silica may be removed from water by treatment with a floc of ferrous, ferric, or aluminum hydroxide. The quantity of floc required has, however, been extremely large if a water of low silica content is desired. Consequently, for some industrial purposes, especially in the generation of high-pressure steam, water, which is essentially free of silica, is costly.

One object of this invention is the provision of a method for removal of substantially all of the silica present in water to render it useful for high-pressure steam boilers.

A further object of the invention is to provide a method for removal of silica by which the size of equipment and the quantity of reagents required are greatly reduced as compared to known means for accomplishing this end.

As a result of our investigation, we have found that silica is present in water in two forms. These are designated, as a matter of convenience and in view of their distinguishing characteristics, by the terms "negative colloid" and "positive ion." The negative colloid or negatively charged colloidal silica is that form of silica which is picked up by a positively charged floc, for example, ferric hydrate or aluminum hydrate, which has been made in water having a pH preferably below 6 or 7 and above 4.5. This negative colloid appears to be electrically neutralized and precipitated by a very small amount of floc.

The portion of the silica which is designated as positive ion silica is not removable by means of the same phenomenon, but can be removed by an adsorption phenomenon using a negatively charged floc, for example, ferrous, ferric or aluminum hydrate in water which is at a pH above 7.

If all the silica were present as a negative colloid, it could be removed completely from water by a very small dosage of the conventional coagulants with the water at a pH below 7. The lower the pH of the water being treated, the smaller the dosage necessary until about 4.5 pH for ferric oxide and 5.5 pH for $Al_2O_3$ is reached. A pH much below this will result in a poor floc or even no floc at all, a fact that is well recognized.

This colloidal silica can be removed in another way. If a floc is made in water above 7 pH it drags down with it a large part of the negative colloid. To make a floc in water above 7 pH in the presence of a negative colloid is not always simple because of the peptizing action of the negatively charged colloid on the negatively charged floc. It can be made, however, in the presence of reasonable amounts of hardness. Positive calcium ions, for example, overcome the peptizing effect of the negative colloid. It cannot be done without hardness because sodium ions have an insufficient coagulating effect. In addition carrying down the colloidal silica the coagulant also adsorbs its quota of positive ion silica. If enough coagulant is used, practically complete removal of the $SiO_2$ will result, but this would be an inefficient use of the coagulent as will be shown hereinafter.

We have found that silica present in water as a negative colloid is converted to positive ions when the pH of the water is raised. The rate of change is increased with increase in pH and with increase in the amount of colloid present. For example, a water at 9 pH containing 14 P. P. M. $SiO_2$ as negative colloid and 21 P. P. M. $SiO_2$ as positive ions does not seem to lose much negative colloid while at the same pH, water containing 20 P. P. M. $SiO_2$ as negative colloid and 30 P.P.M. positive ions, loses very quickly one-third its negative colloid with a corresponding increase in positive ions.

In general it is more economical, especially if the per cent of negative colloidal silica in the water is high, to remove it separately from the water by means of a positively charged floc with the water at a pH between 4.5 and 6, than it is to convert it to positive ions and subsequently to remove the ions in the manner previously described.

We have also discovered that the removal of positive ion silica by means of iron or aluminum floc is an adsorption phenomenon and the equilibrium relationships of this silica in solution and the silica adsorbed is essentially a logarithmic function. This equilibrium relationship is expressed graphically in the accompanying figure wherein the residual positive ion silica in solution, expressed in parts per million which is in equilibrium with a floc, is plotted against the ratio of the total positive ion silica ($SiO_2$) adsorbed on the floc to the total $Fe_2O_3$ or $Al_2O_3$ of the floc in question.

In taking advantage of our discovery, and in accordance with the principles of the present invention, the positive ion silica is removed by means of a floc in a counter-current continuous or counter-current batch process. In other words, the fresh floc comes in contact with the partially processed water while the partially spent or used floc is brought into contact with the raw water. In this way, it is possible to reduce the positive ion silica to almost any desired concentration.

As a further feature to our invention, we have discovered that whereas the positive ion silica is removed most advantageously with the water containing it at a pH above 7, and preferably at about 9, the floc used need not be made at this pH, and in fact it is desirable that it be made at a lower pH to avoid sodium ion adsorption which reduces the effectiveness of the floc. Thus, we have found, for example, that as much as 15% more silica per unit of $Fe_2O_3$ may be removed with a ferric floc made at a pH of 4 to 6 than one made at a pH above 7. This is illustrated by two of the curves in the figure.

It is apparent that the colloidal silica may be removed by means of a floc which is positively charged, i. e. has a pH below 6 or 7 and above 4.5, or by means of a floc which is above a pH of 7, provided sufficient calcium ions (hardness) are present to overcome the peptizing effect of the negative colloid, or by other means or conditions which overcome the peptizing effect, as for example, the presence of a sufficient excess of positive ion silica. The amount of floc necessary for removing the colloidal silica in either case is small. With a highly charged floc, say of pH 4.5, it is possible to remove as much as four parts of $SiO_2$ in the form of a negative colloid with one part of ferric floc. Even at a pH of 6, it requires only 3 parts of $Fe_2O_3$ to remove one part of $SiO_2$. By comparison, the amount of positive ion silica which is removed under similar conditions is really insignificant.

The following example illustrates the practice of our invention and the manner of using the adsorption curve, illustrated in the figure, which is based on $Fe_2O_3$ floc made at pH 9 from ferric sulfate and an alkali. It should be remembered that natural waters are variable materials, and it is wise to make separate curves for each water to be treated.

Assuming for the purpose of this example that the finished water shall not contain more than one part per million of positive ion silica and that the raw water contains 32.7 parts per million of silica in the form of positive ions, it is evident that if a single batch treatment were to be used, the weight ratio of positive ion silica to ferric floc at the end of the treatment must not exceed about .042 (see curve for $Fe_2O_3$ floc made at pH 9 in the figure).

For the purpose of this example, it is assumed that 150 parts of $Fe_2O_3$, made at pH 9, is to be used in the form of a hydrate floc for each million parts of water and that the final water must not have in excess of one part per million of positive ion silica. The problem presented is how many counter-current batch treatments will be necessary.

EXAMPLE 1

SAMPLE CALCULATION FROM CURVE

*Final pass*

Water leaving: 1 P. P. M. $SiO_2$.

According to the figure: 1 P. P. M. $SiO_2$ left in solution gives a ratio of $$\frac{SiO_2 \text{ adsorbed}}{Fe_2O_3} \text{ equal to .042 on floc.}$$

Since $$\frac{SiO_2 \text{ (adsorbed)}}{150} = .042: 6.29 \text{ P. P. M. } SiO_2$$

is adsorbed on floc during final pass.

Water leaving contains_____ 1.00 P. P. M. $SiO_2$
Floc contains _____ 6.29 P. P. M. $SiO_2$ Water entering contained_____ 7.29 P. P. M. $SiO_2$

*Next to last pass*

Water leaving must contain same amount of $SiO_2$ as water entering final pass, to wit 7.29 P. P. M. $SiO_2$.

According to the figure: 7.29 P. P. M. $SiO_2$ in solution gives a ratio of $$\frac{SiO_2 \text{ adsorbed}}{Fe_2O_3 \text{ (150)}} \text{ equal to .112 or } \frac{16.8}{150} = .112$$

Floc contains_____ 16.8 P. P. M.
Of which____6.29 P. P. M. $SiO_2$ was adsorbed in final pass $SiO_2$ put on floc in this pass 10.51 P. P. M. $SiO_2$.
Entering water contained 7.29+10.51=17.80 P. P. M. $SiO_2$

*Second from last pass*

Water leaving contained_____ 17.8 P. P. M. $SiO_2$ $$\frac{SiO_2 \text{ adsorbed}}{Fe_2O_3 \text{ (150)}} = .175$$

Total $SiO_2$ adsorbed
=150×.175=26.1 P. P. M. $SiO_2$
$SiO_2$ previously adsorbed_____ 16.8 P. P. M.

$SiO_2$ adsorbed during present
pass _____ 9.3 P. P. M. $SiO_2$
Water entering contained
17.8+9.3=27.1 P. P. M. $SiO_2$

*Third from last pass*

Water leaving contained_____ 27.1 P. P. M. $SiO_2$ $$\frac{SiO_2 \text{ adsorbed}}{Fe_2O_3 \text{ (150)}} = .212$$

Total $SiO_2$ adsorbed
=150×.212=31.7 P. P. M.
$SiO_2$ adsorbed previously_____ 26.1 P. P. M.

$SiO_2$ adsorbed during present
pass _____ 5.6 P. P. M.
Water entering contained
27.1+5.6=32.7 P. P. M. $SiO_2$ Thus a four step or four stage counter-current batch system would be necessary to obtain the desired quality of water, namely having 1 P. P. M. $SiO_2$ using 150 P. P. M. of floc.

It can be seen from the curve that had 150 P. P. M. of fresh $Fe_2O_3$ floc (made at pH 9) been used in a single batch of water containing 32.7 P. P. M. $SiO_2$, the result would have been a water from which 21 P. P. M. $SiO_2$ had been adsorbed and 11.7 P. P. M. left as residual $SiO_2$. It can also be seen from the curve that a single batch treatment of water containing 32.7 P. P. M. $SiO_2$ would require 755 P. P. M. $Fe_2O_3$ to reduce it to 1 P. P. M. residual silica. Thus under the condition of the example, the single batch process leaves 11.7 times as much $SiO_2$ in solution as in the case of the counter-current treatment using the same quantity of $Fe_2O_3$, or it requires 5.04 times as much $Fe_2O_3$ to produce the same result as the counter-current process. These results are typical.

EXAMPLE 2

Using 150 parts of ferric floc made at a pH of 5 per million parts of water and otherwise following a three-step or three stage counter-current batch procedure with the water being treated at pH 9, it is possible to treat water having as high as 37.2 P. P. M. of positive ion silica and still produce water of 1 P. P. M. or less of silica. The stepwise calculations follow:

*Final pass*

Water leaving 1 P. P. M. $SiO_2$.
$SiO_2=.05$ ∴ 7.5 P. P. M. $SiO_2$ is on floc.

Water leaving contains_____ 1.00 P. P. M. $SiO_2$
Floc contains_____ 7.50
                               ─────
Water entering contained_____ 8.50 P. P. M. $SiO_2$

*Next to last pass*

Water leaving is same as water entering last pass or 8.50 P. P. M. $SiO_2$.

$\frac{SiO_2}{150}=.162$ ∴ 24.3 P. P. M. $SiO_2$ is on floc

Floc contains_____ 24.3 P. P. M. $SiO_2$ total
$SiO_2$ previously on floc____ 7.5
                               ─────
$SiO_2$ on at this pass_____ 16.8 P. P. M.

Entering water 8.50+16.8=25.3 P. P. M. $SiO_2$.

*Second last pass*

Water leaving 25.3 P. P. M. $SiO_2$ $\frac{SiO_2}{150}=.241$ ∴ 36.2 P. P. M. $SiO_2$ is on floc Total $SiO_2$ adsorbed_____ 36.2 P. P. M.
Previously adsorbed_____ 24.3
                                   ─────
Adsorbed this pass_____ 11.9 P. P. M.

Water entering 25.3+11.9=37.2 P. P. M. $SiO_2$.

EXAMPLE 3

Using 150 parts of an alumina floc per million of water and otherwise following a two step counter-current batch procedure, one may start with a water containing 74.7 P. P. M. of positive ion silica and deliver a finished water having less than 1 P. P. M. of silica. The step-wise calculations follow:

*Final pass*

Water leaving 1 P. P. M. $SiO_2$ $\frac{SiO_2}{150}=.116$ ∴ 17.4 P. P. M. $SiO_2$ on floc Water leaving contains_____ 1.00 P. P. M. $SiO_2$
Floc contains_____ 17.4 P. P. M. $SiO_2$
                               ─────
Water entering contained_____ 18.4 P. P. M. $SiO_2$

*Next last pass*

Water leaving is same as water entering last pass or 18.4 P. P. M. $SiO_2$.

$\frac{SiO_2}{150}=.492$ ∴ 73.7 P. P. M. $SiO_2$ is on floc.

Floc contains_____ 73.7 P. P. M. $SiO_2$
Previously on floc_____ 17.4 P. P. M. $SiO_2$
                               ─────
$SiO_2$ on at this pass_____ 56.3 P. P. M. $SiO_2$ Entering water 18.4+56.3=74.7 P. P. M. $SiO_2$.

Although the alumina floc is relatively more effective than the ferric floc as far as silica removal is concerned, its use is attended by certain shortcomings not shared by iron flocs due apparently to the solubility of the alumina floc in the water. For this reason, we usually prefer iron hydroxide flocs.

In preparing an adsorption curve for a particular water, the procedure which may be followed can readily be understood from the following description. In general, we prefer to remove the colloidal silica, especially if the amount thereof is known to be large, before estimating the amount of positive ion silica. To this end, we reduce the pH of the water sample to about 4 or 5, and thereafter precipitate the colloidal silica by the addition of a small amount of ferric floc. It has already been indicated above that the amount of ferric floc necessary for this purpose is very small and does not affect significantly the amount of positive ion silica present. Thereafter, we determine the amount of silica in the water gravimetrically and take this to be the total positive ion silica present.

After adjusting its pH to 9, the prepared water is divided into as many parts as are required to construct a curve, usually 5 or 6 parts are sufficient. We then add a known quantity of floc to a known quantity of water, mix the floc thoroughly to establish equilibrium conditions and ascertain the amount of silica left in the water by gravimetric method. The difference between the silica contents before and after the treatment represents the amount of silica adsorbed. By repeating the experiment on fresh samples of the prepared water, using differing quantities of floc, a curve representing the equilibrium relationship between residual positive ion silica in solution and the ratio of adsorbed silica to the floc, may be constructed readily. The results so obtained are then tabulated or plotted as illustrated in the figure.

While for most purposes, the successive counter-current batch-wise treatment of water, as illustrated in the examples, has been found convenient, other methods may be employed; for example, the continuous flow of water through a series of settling basins or thickeners, the clear effluent being mixed with comparatively fresher floc and again settled, whereas the thickened floc is mixed with relatively raw water and settled. The mechanical means for and mechanical method of handling the solutions and floc may vary widely insofar as the present invention is concerned. See in this connection U. S. Patent 2,006,853 wherein a counter-current treatment of aqueous alum solution with lead peroxide to remove soluble iron impurities is described. Similar handling may be applied here.

The preparation of the floc for use in the present process involves simply the precipitation of an aqueous solution of a salt of the metal by means of a base and as already indicated, preferably under controlled pH conditions. The water-soluble salt which forms concurrently with the floc may first be washed free of the floc by means of water if the addition of the soluble salt to the water to be de-silicified would be objectionable.

The term "floc" appearing in the claims is understood to contemplate flocs of aluminum, ferrous or ferric hydroxides or mixtures thereof.

We are aware that it has been proposed heretofore to treat water successively with coagulant, including coagulants of iron and aluminum types, and we are also aware that it has been proposed heretofore to remove silica by means of a floc. However, we make no claims to such methods or treatments.

This application is a division of our copending application Serial No. 283,588, filed July 10, 1939.

What we claim is:

1. The method of removing positive ion silica from water having a pH value above 7 and below 10, which comprises subjecting the water to a treatment with a floc of a metal hydroxide selected from the group consisting of ferric hydroxide, ferrous hydroxide, aluminum hydroxide and mixtures thereof, which treatment includes contacting the water successively with floc substantially saturated with silica and then with flocs of diminishing silica content until finally the substantially silica free water is contacted with fresh floc; and finally separating the floc from the silica free water, said contacting treatment in each instance including agitating the water and floc until equilibrium between the silica adsorbed on the floc and the silica remaining in solution is reached and permitting the floc to settle.

2. The method of removing positive ion silica from water containing the same, which comprises adjusting the hydrogen ion concentration of the water to a pH above 7 and below 10 by adding an alkaline substance thereto, then subjecting the water to a treatment with a floc of a metal hydroxide selected from the group consisting of ferric hydroxide, ferrous hydroxide, aluminum hydroxide and mixtures thereof, which treatment includes contacting the water successively with floc substantially saturated with silica and then with flocs of diminishing silica content until finally the substantially silica free water is contacted with fresh floc; and finally separating the floc from the silica free water, said contacting treatment in each instance including agitating the water and floc until equilibrium between the silica adsorbed on the floc and the silica remaining in solution is reached and permitting the floc to settle.

3. The method as defined in claim 1 and further characterized in that the treatment with the floc is effected in a continuous manner.

4. The method as defined in claim 1 and further characterized in that the metal hydroxide floc employed is formed at a pH less than the pH of the water being treated.

5. The method as defined in claim 1 and further characterized in that the water is provided with a pH above 7 and below 10 and the metal hydroxide floc employed is separately made at a pH of about 4 to 6.

6. The method as defined in claim 1 and further characterized in that the metal hydroxide floc employed is made in water at a pH above 7 and below 10 and in the presence of calcium ions.

7. The method as defined in claim 1 and further characterized in that the metal hydroxide floc employed is ferric hydrate.

8. The method as defined in claim 1 and further characterized in that the metal hydroxide floc employed is ferrous hydrate.

9. The method as defined in claim 1 and further characterized in that the metal hydroxide floc employed is aluminum hydrate.

10. The method of removing dissolved silica from water at a pH between 4.5 and 7, which silica is present both as negatively charged colloidal silica and as positive ion silica, which comprises precipitating the colloidal silica by means of a positively charged floc, removing the floc and precipitated silica from the water, adjusting the hydrogen ion concentration of the water to a pH above 7 and below 10 by adding an alkaline substance thereto, then subjecting the water to a treatment with a floc of a metal hydroxide selected from the group consisting of ferric hydroxide, ferrous hydroxide, aluminum hydroxide and mixtures thereof, which treatment includes contacting the water successively with floc substantially saturated with silica and then with flocs of diminishing silica content until finally the substantially silica free water is contacted with fresh floc; and separating the floc from the water with at least a portion of said positive ion silica adsorbed thereon, said contacting treatment in each instance including agitating the water and floc until equilibrium between the silica adsorbed on the floc and the silica remaining in solution is reached and permitting the floc to settle.

11. The method of removing dissolved silica from water containing the same, which silica is present both as negatively charged colloidal silica and as positive ion silica, which comprises adjusting the hydrogen ion concentration of the water to a pH between 4.5 and 7 by adding an acid substance thereto, precipitating the colloidal silica by adding a positively charged floc to the water, removing the floc and precipitated silica from the water, adjusting the hydrogen ion concentration of the water to a pH above 7 and below 10 by adding an alkaline substance thereto, then subjecting the water to a treatment with a floc of a metal hydroxide selected from the group consisting of ferric hydroxide, ferrous hydroxide, aluminum hydroxide and mixtures thereof, which treatment includes contacting the water successively with floc substantially saturated with silica and then with flocs of diminishing silica content until finally the substantially silica free water is contacted with fresh floc; and separating the floc from the water with at least a portion of said positive ion silica adsorbed thereon, said contacting treatment in each instance including agitating the water and floc until equilibrium between the silica adsorbed on the floc and the silica remaining in solution is reached and permitting the floc to settle.

12. The method of removing dissolved silica from water containing the same, which silica is present both as negatively charged colloidal silica and as positive ion silica, which comprises adjusting the hydrogen ion concentration of the water to a pH of approximately 4.5 to 6 by adding an acid substance thereto, precipitating the colloidal silica by adding a metal hydroxide floc to the water, removing said floc and precipitated silica from the water, adjusting the hydrogen ion concentration of the water to a pH above 7 and below 10 by adding an alkaline substance thereto, then subjecting the water to a treatment with a floc of a metal hydroxide selected from the group consisting of ferric hydroxide, ferrous hydroxide, aluminum hydroxide and mixtures thereof, which floc has been separately made at a pH of about 4 to 6, and which treatment includes contacting the water successively with floc substantially saturated with silica and then with flocs of diminishing silica content until finally the substantially silica free water is contacted with fresh floc; and separating the floc from the water with at least a portion of said positive ion silica adsorbed thereon, said contacting treatment in each instance including agitating the water and floc until equilibrium between the silica adsorbed on the floc and the silica remaining in solution is reached and permitting the floc to settle.

13. The method as defined in claim 10 and further characterized in that the floc used to adsorb the positive ion silica is made in water at a pH above 7 and in the presence of hardness.

14. The method as defined in claim 10 and further characterized in that the removal of the positive ion silica is effected in a series of separate and successive stages.

15. The method as defined in claim 10 and further characterized in that the removal of the positive ion silica is effected in a continuous manner.

16. The method as defined in claim 12 and further characterized in that the metal hydroxide flocs employed are ferric hydrates.

17. The method as defined in claim 12 and further characterized in that the metal hydroxide flocs employed are ferrous hydrates.

18. The method as defined in claim 12 and further characterized in that the metal hydroxide flocs employed are aluminum hydrates.

19. The method of removing dissolved silica from water having a pH above 7 and below 10, which silica is present both as negatively charged colloidal silica and as positive ion silica, which comprises subjecting the water to a treatment with a floc of a metal hydroxide selected from the group consisting of ferric hydroxide, ferrous hydroxide, aluminum hydroxide and mixtures thereof, which treatment is carried out in the presence of hardness and includes contacting the water successively with floc substantially saturated with silica and then with flocs of diminishing silica content until finally the substantially silica free water is contacted with fresh floc, said contacting treatment in each instance including agitating the water and floc until equilibrium between the silica adsorbed on the floc and the silica remaining in solution is reached and permitting the floc to settle.

20. The method of removing dissolved silica from water containing the same, which silica is present both as negatively charged colloidal silica and as positive ion silica, which comprises adjusting the hydrogen ion concentration of the water to a pH above 7 and below 10 by adding an alkaline substance thereto, and then subjecting the water to a treatment with a floc of a metal hydroxide selected from the group consisting of ferric hydroxide, ferrous hydroxide, aluminum hydroxide and mixtures thereof, which treatment is carried out in the presence of hardness and includes contacting the water successively with floc substantially saturated with silica and with flocs of diminishing silica content until finally the substantially silica free water is contacted with fresh floc, said contacting treatment in each instance including agitating the water and floc until equilibrium between the silica adsorbed on the floc and the silica remaining in solution is reached and permitting the floc to settle.

WILLIAM S. WILSON.
HOWARD NOYES DOLE.